United States Patent
Koch

(10) Patent No.: US 7,559,382 B2
(45) Date of Patent: Jul. 14, 2009

(54) HARD MATERIAL HEAD AND ROTARY PERCUSSION DRILL BIT

(75) Inventor: Olaf Koch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 77 days.

(21) Appl. No.: 11/807,321

(22) Filed: May 25, 2007

(65) Prior Publication Data

US 2007/0278016 A1 Dec. 6, 2007

(30) Foreign Application Priority Data

May 30, 2006 (DE) .................. 10 2006 000 251

(51) Int. Cl.
*E21B 10/36* (2006.01)
(52) U.S. Cl. .................................. 175/420.1; 175/415
(58) Field of Classification Search ............. 175/420.1, 175/427, 415
See application file for complete search history.

(56) References Cited

U.S. PATENT DOCUMENTS 1,136,987 A * 4/1915 Wakfer ................. 175/415
5,492,187 A * 2/1996 Neukirchen et al. ....... 175/394
5,863,162 A 1/1999 Karlsson
2001/0013429 A1 * 8/2001 Hauptmann et al. ....... 175/395
2003/0039523 A1 2/2003 Kemmer
2004/0208716 A1 10/2004 Krenzer
2006/0072976 A1 4/2006 Frota de Souza

FOREIGN PATENT DOCUMENTS

| DE | 5041331 | 3/2007 |
| WO | WO2005115667 | 12/2005 |
| WO | 6114306 | 11/2006 |
| ZA | 20020004777 A | 2/2003 |

* cited by examiner

*Primary Examiner*—David J Bagnell
*Assistant Examiner*—Cathleen R Hutchins
(74) *Attorney, Agent, or Firm*—Abelman, Frayne & Schwab

(57) ABSTRACT

A hard material head (1) for a rotary percussion drill bit (2) having an elongated shaft (15) including at least three cutting edges (4) distributed circumferentially within a circumscribing circle, a bottom surface (6) located opposite the cutting edges (4) and fastened by a material bond to an end (8) of the drill bit shaft (15) of the rotary percussion drill bit (2), concave side surfaces (5) formed circumferentially between adjacent cutting edges (4), and a peripheral pocket (9) opening toward the bottom surface (6) and formed, respectively, in at least two concave side surfaces (5) located opposite one another, and in which a corresponding axial pin (10, 10') formed on a shaft end (8) is form-locking engageable.

17 Claims, 2 Drawing Sheets

HARD MATERIAL HEAD AND ROTARY PERCUSSION DRILL BIT

BACKGROUND OF THE INVENTION

1. Field of the Invention

The invention is directed to a hard material head for a rotary percussion drill bit, particularly in the diameter range of 4 mm to 45 mm, especially from 8 mm to 16 mm, and to a rotary percussion drill bit outfitted therewith for use with hand-held rotary percussion power tools.

2. Description of the Prior Art

According to DE10208631, for example, rotary percussion drill bits of the type mentioned above for hand-held rotary percussion power tools are usually outfitted in the end of the shaft with a chisel-type hard metal plate which is brazed at the bottom and along two opposite lateral fastening surfaces into a receiving slot extending diametrically through the shaft end.

DE4419641 discloses a rotary percussion drill bit which is optimized for rotary percussion drilling in reinforced concrete and which has a compact hard material head with main cutters and auxiliary cutters. The hard material head is butt-soldered to the base surface over the bottom area opposite the cutters. When encountering iron reinforcements, the leading auxiliary cutter lifts the drilling head axially somewhat so that it does not hook into the iron reinforcement.

DE4339245 discloses a rotary percussion drill bit which is optimized for rotary percussion drilling in reinforced concrete and which has a square hard material head with main cutters and auxiliary cutters. On the shaft side, the hard material head has a diagonally extending slot for an associated pin of the shaft end that engages therein by positive engagement, i.e., form-locking engagement. Apart from that, the hard material head is butt-soldered.

DE2246965 discloses a butterfly-shaped hard material head with only one diagonally extending cutter and exactly two oppositely located convex and concave side surfaces, respectively. Only the convex side surfaces form circumferential lengthwise peripheral pockets which are open on the shaft side exclusively in the middle portion. Suitably fitting punctiform axial pins of the shaft end associated with the peripheral pockets engage therein by form-locking engagement and form a smooth axial continuation of the side surfaces. Rotary percussion drill bits with only one diagonally extending cutter, that is, exactly two circumferentially distributed cutting edges, tend to jam in iron reinforcements when carrying out rotary percussion drilling in reinforced concrete.

DE10006936 discloses a rotary percussion drill bit with main cutters and auxiliary cutters which is optimized for rotary percussion drilling in reinforced concrete and which has an X-shaped hard material head of sintered material which is soldered in the shaft end exclusively along two oppositely located concave lateral fastening surfaces and the bottom surface into a slot between two circumferential lengthwise axial pins arranged in a suitable X-shape. The associated X-shaped hard material head accord to DE1006936 has a bevel in the bottom surface opposite to the cutting edges exclusively at the oppositely located concave lateral fastening surfaces. The axial pins of the shaft end which project radially over the axial projection of the concave lateral fastening surfaces of the hard material head delimit the removal groove for drillings, which extends to the circumscribing circle, and therefore limits the maximum drilling capacity, especially in the diameter range of 8 mm to 16 mm.

SUMMARY OF THE INVENTION

It is the object of the invention to increase the drilling capacity of rotary percussion drill bits which are optimized for rotary percussion drilling in reinforced concrete.

Accordingly, a hard material head for a rotary percussion drill bit has at least three cutting edges distributed along the circumference within a circumscribing circle, a bottom surface which is designed for fastening by a material bond to an end of the drill shaft of the rotary percussion drill bit and which is situated opposite to this shaft end, and concave side surfaces, with a peripheral pocket, which opens toward the bottom surface, being formed, respectively, in each of at least two concave side surfaces located opposite one another, and with an axial pin of the shaft end, which complements the peripheral pocket being form locking therein.

The formation of a peripheral pocket, which is suitable for an axial form locking engagement with the shaft end, provides for a radial engagement of the axial pin in the pocket. This provides for the opening up of additional free space for the removal groove which extends up to the circumscribing circle.

The peripheral pocket is advantageously axially prism-shaped so that the exact coaxial centering in the corresponding form-lockingly engaging axial pins does not depend on axial tolerances occurring when hard soldering (i.e., brazing) to the shaft end.

The contour length of the peripheral pocket advantageously extends exclusively over the center longitudinal area of the concave side surface so that its tangential edge is used for transmitting torque.

In an advantageous alternative embodiment, the contour length of the peripheral pocket extends over the entire circumferential lateral length of the side surface so that the tangential surface components of the concave side surface are used in their entirety for transmitting torque.

In one embodiment, exactly four concave side surfaces advantageously form in each instance a peripheral pocket resulting in symmetry with a quadruple-thread shaft.

Alternatively, exclusively two oppositely located side surfaces advantageously form in each instance a peripheral pocket so that the rest of the side surfaces which extend in a straight line to the bottom surface (or which are slightly beveled for receiving emerging bronze) can be butt-ended to the end face of the shaft end and can accordingly form an axially smooth continuation therein (i.e., without discontinuity or bending).

The sum of the circumferential lengths of all of the peripheral pockets is advantageously one third to two thirds, more advantageously one half, of the circumference of the circumscribing circle so that the associated axial pins, which exactly fill these peripheral pockets, are sufficiently rigid against torsion for transmitting high torques.

The width of the peripheral pocket is advantageously one twentieth to one fifth, more advantageously, one tenth, of the diameter of the circumscribing circle so that the associated axial pin, which exactly fills this peripheral pocket, has a sufficiently thin surface to be in the extensible planar stress condition without hindering transverse contraction.

The axial height of the peripheral pocket is advantageously one third to two thirds, more advantageously one half, of the radial peripheral height of the side surfaces. In this manner, the axial stresses, which can be caused by different thermal expansion coefficients during normal use and hard soldering, are introduced substantially from the drill shaft into the hard material head by means of shearing stresses at the axial pins, and these axial stresses are substantially reduced at the axial joint so that they have no damaging effect in practice.

In one embodiment, the hard material head has exactly four circumferentially distributed cutting edges so that they can be arranged symmetric to a quadruple-thread shaft.

In an advantageous manner, exactly two oppositely located cutting edges are associated with two main cutters, respectively, and two radially shorter auxiliary cutters so as to improve behavior with respect to reinforcements.

The hard material head is advantageously connected by material bonding, and more advantageously, for example, brazed with bronze along the peripheral pocket arranged in the concave side surface to an axial pin of a shaft end of a rotary percussion drill bit, which the axial pin positively engages therein. A rotary percussion drill bit with a high drilling capacity is achieved in this manner.

The hard material head is advantageously soldered to an end face of the shaft end along the bottom surface so that a good transmission of percussive pulses is achieved.

In an advantageous manner, a side surface which extends axially in a straight line up to the axial joint and which, more advantageously, is slightly beveled for receiving emerging bronze, continues smoothly axially along this axial joint (i.e., without discontinuity or bending) so that, at the axial joint, there is no change in the cross section of the removal groove which extends up to the circumscribing circle and in which removal space can be set aside for drillings.

A cruciform hard material head is advantageously soldered along exactly four peripheral pockets with exactly four associated circumferentially elongated axial pins so that a rotary percussion drill bit which is optimized for rotary percussion drilling of reinforced concrete has a high drilling capacity.

In an advantageous alternative embodiment, an X-shaped hard material head is soldered to exactly two associated circumferentially elongated axial pins of the shaft end along exactly two oppositely located peripheral pockets so that a rotary percussion drill bit which is optimized for rotary percussion drilling of reinforced concrete has a high drilling capacity.

The elongated axial pins are advantageously thicker on the radial outer side of the auxiliary cutter than on the radial outer side of the main cutter so that higher torques can be introduced at the auxiliary cutter which is subject to less torsional stress.

The invention will now be described in more detail below with reference to advantageous embodiments of the invention shown in the drawings.

Figure 1:
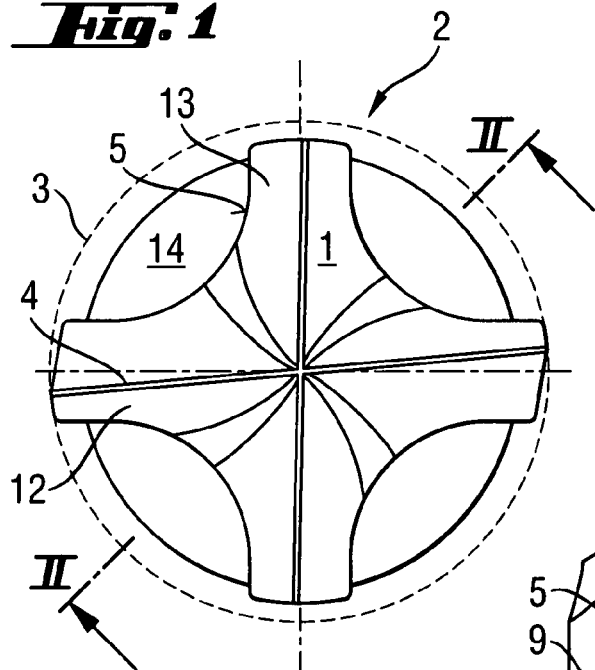
FIG. 1 a top view of a first embodiment of a rotary percussion drill bit of the present invention.

To facilitate understanding of the invention, identical reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF THE PREFERRED EMBODIMENTS

Referring to FIG. 1, a hard material head 1 of a rotary percussion drill bit 2 has exactly four circumferentially distributed cutting edges 4 in a circumscribed circle 3 and exactly four concave side surfaces 5 lying circumferentially therebetween, two of which lie opposite one another in each instance. Two main cutters 12 and two radially shorter, auxiliary cutters 13 are associated in each instance with exactly two oppositely located cutting edges 4. An axially extending removal groove 14 extends from each side surface 5 to the circumscribing circle 3.

Figure 2:
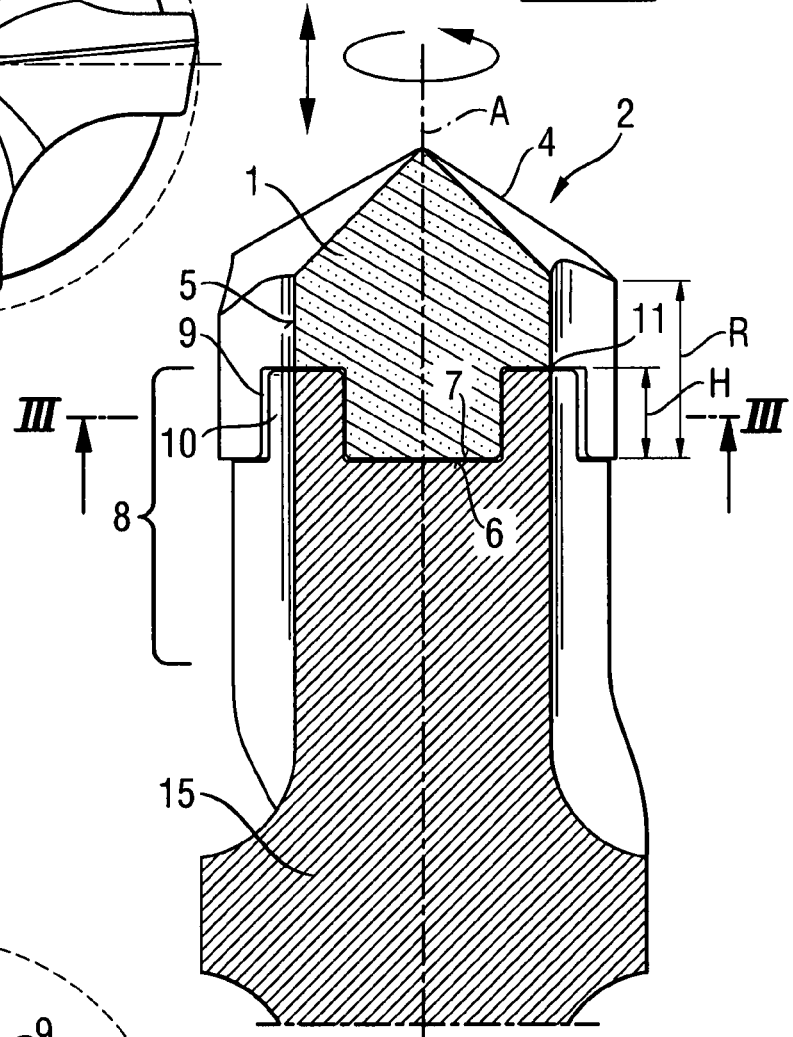
FIG. 2 a longitudinal cress-sectional view of the rotary percussion drill bit along line II-II of FIG. 1.

Referring to FIG. 2, a bottom surface 6, which is brazed with bronze (not shown) to an end face 7 of an axially extending shaft end 8 of a quadruple-spiral drill bit shaft 15, lies opposite the cutting edges 4 of the rotary percussion drill bit 2. Accordingly, the rotary percussion drill bit 2 is quadruple-spiraled around the axis A and has the hard material head 1. Each side surface 5 forms a peripheral pocket 8 which opens toward the bottom surface 6 and in which corresponding form-locking engaging axial pins 10 of the shaft end 8 are brazed, also with bronze (not shown). A side surface 5 extending axially in a straight line up to an axial joint 11 forms a smooth axial continuation over this axial joint 11. The peripheral pockets 9 and the axial pins 10 are axially prism-shaped, and the axial height H of the peripheral pocket 9 and of the axial pin 10 is one half of the radial peripheral height R of the side surface 5.

Figure 3:
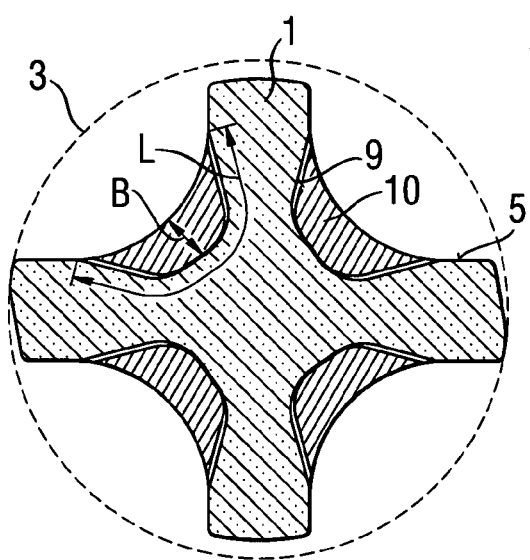
FIG. 3 a rotary percussion drill bit in cross section according to section line III-III of FIG. 2.

Referring to FIG. 3, the cruciform hard material head 1 is brazed with bronze (not shown) along exactly four peripheral pockets 9 with exactly four associated, circumferentially elongated axial pins 10, each side surface 5 forming exactly one peripheral pocket 9 which extends exclusively along a central longitudinal area of the concave side surface 5. The width B of the peripheral pocket 9 is one tenth of the diameter of the circumscribing circle 3, and the sum of the contour lengths L (measured in the cross-sectional plane) of all of the peripheral pockets 9 is one half of the circumference of the circumscribing circle 3.

Figure 4:
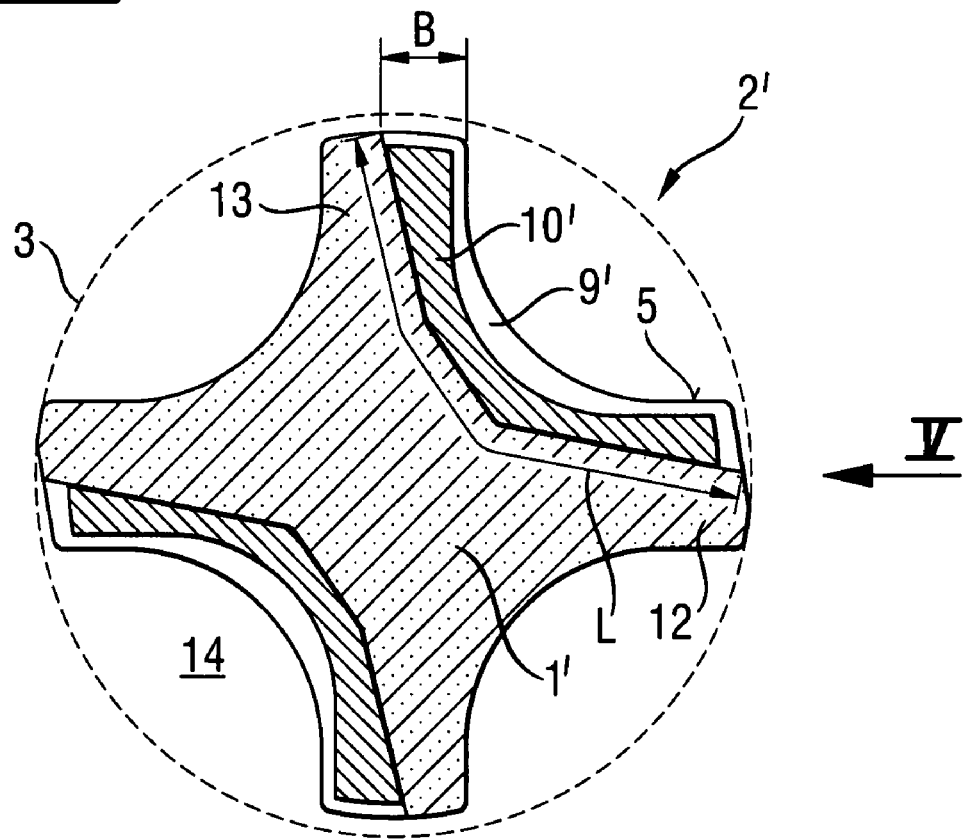
FIG. 4 cross sectional view of a second embodiment of a rotary percussion drill bit of the present invention according to section line IV-IV of FIG. 5.
Figure 5:
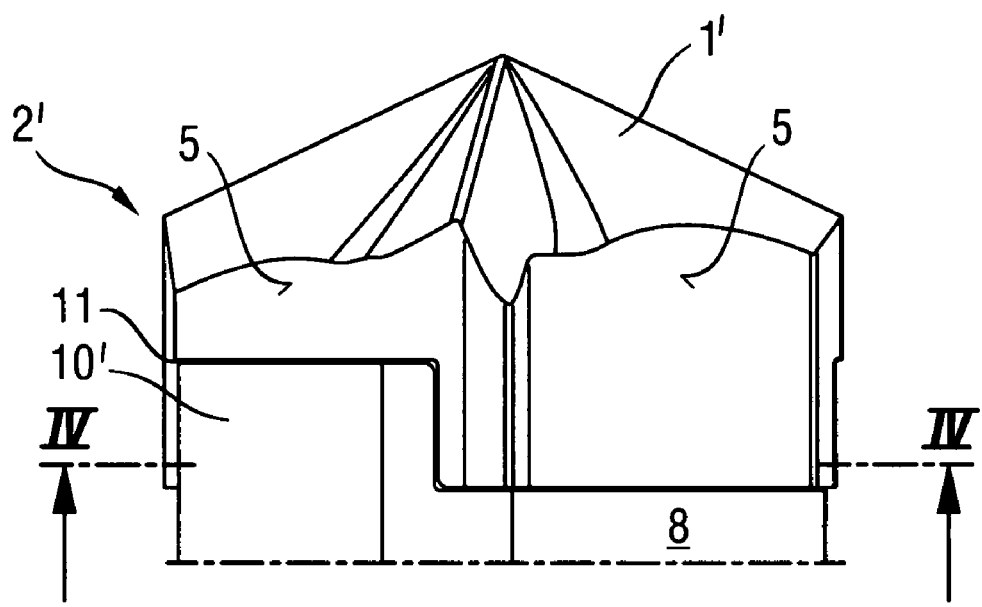
FIG. 5 a partial side view of the second embodiment of the rotary percussion drill bit according to arrow V of FIG. 4.

In contrast to FIGS. 1 to 3, in the variant of the rotary percussion drill bit 2'shown in FIG. 4 and FIG. 5 with an X-shaped hard material head 1', exclusively two oppositely located side surfaces 5 form a peripheral pocket 9' in each instance. The side surfaces 5 are brazed with bronze (not shown) to exactly two associated circumferentially elongated axial pins 10' of the shaft end 8. The contour length L of the peripheral pocket 9' extends along the entire lateral length (measured in the cross-sectional plane) of the concave side surface 5. Since the circumferentially elongated axial pins 10' are everywhere thinner than the width B of the peripheral pockets 9', there is an abrupt transition on the radial outer side at the axial joint 11 so that the removal groove 14 extending to the circumscribing circle 3 is enlarged on the shaft side. Accordingly, the elongated axial pins 10' are thicker on the radial outer side of the auxiliary cutter 13 than on the radial outer side of the main cutter 12.

Though the present invention was shown and described with references to the preferred embodiments, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

I claim:

1. A hard material head for a rotary percussion drill bit (2,2') having an elongated shaft (15), the hard material head comprising:
    at least three cutting edges (4) distributed circumferentially within a circumscribing circle (3);
    a bottom surface (6) located opposite the cutting edges (4) for being fastened by a material bond to an end (8) of the drill bit shaft (15) of the rotary percussion drill bit (2,2');
    a concave side surface (5) formed circumferentially between adjacent cutting edges (4); and
    a peripheral pocket (9,9') opening toward the bottom surface (6) and formed, respectively, in at least two concave side surfaces (5) located opposite one another, which is limited by a closing surface radially spaced from the respective concave side surface, and in which a corresponding axial pin (10,10') formed on the shaft end (8) is formlockingly engageable.

2. The hard material head according to claim 1, wherein the peripheral pocket (9,9') is axially prism-shaped.

3. The hard material head according to claim 1, wherein a contour length (L) of the peripheral pocket (9) extends exclusively over the center longitudinal area of the concave side surface (5).

4. The hard material head according to claim 1, wherein a contour length (L) of the peripheral pocket (9') extends over the entire lateral length of the side surface (5).

5. The hard material head according to claim 1, wherein exactly four concave side surfaces (5) form in each instance a peripheral pocket (9).

6. The hard material head according to claim 1, wherein exclusively two oppositely located side surfaces (5) form in each instance a peripheral pocket (9').

7. The hard material head according to claim 1, wherein each peripheral pocket has a contour length (L) and the sum of a circumferential lengths (L) of all of the peripheral pockets (9,9') is one third to two thirds of a circumference of the circumscribing circle (3).

8. The hard material head according to claim 1, wherein a width (B) of the peripheral pocket (9,9') is one twentieth to one fifth of the diameter of the circumscribing circle (3).

9. The hard material head according to claim 1, wherein a axial height (H) of the peripheral pocket (9,9') is one third to two thirds of a radial peripheral height (R) of the side surfaces (5).

10. The hard material head according to claim 1, wherein there are exactly four circumferentially distributed cutting edges (4).

11. The hard material head according to claim 10, wherein exactly two oppositely located cutting edges (4) are associated in each instance with two main cutters (12) and two radially shorter auxiliary cutters (13).

12. The hard material head according to claim 1, further comprising a material-bond type connection along the peripheral pocket (9,9') arranged in the concave side surface (5) to an axial pin (10,10') of the shaft end (8) of the rotary percussion drill bit (2,2'), wherein said axial pin (10,10') engages therein by form-locking engagement.

13. The hard material head according to claim 1, wherein the bottom surface (6) is soldered to an end face (7) of the shaft end (8).

14. The hard material head according to claim 13, wherein a side surface (5) which extends axially in a straight line up to an axial joint (11) forms a smooth axial continuation over this axial joint (11).

15. The hard material head according to claim 12, wherein exactly four peripheral pockets (8) are soldered to exactly four associated circumferentially elongated axial pins (10) to form a cruciform construction of said hard material head.

16. The hard material head according to claim 12, wherein exactly two oppositely located peripheral pockets (9') are soldered to exactly two associated circumferentially elongated axial pins (10') to form an X-shaped construction of said hard material head.

17. The hard material head according to claim 16, wherein the elongated axial pins (10') are thicker on the radial outer side of the auxiliary cutter (13) than on the radial outer side of the main cutter (12).

* * * * *